Dec. 23, 1958 W. E. FRANK ET AL 2,866,141
PRESSURE SENSING DEVICES
Filed June 23, 1954 2 Sheets-Sheet 1
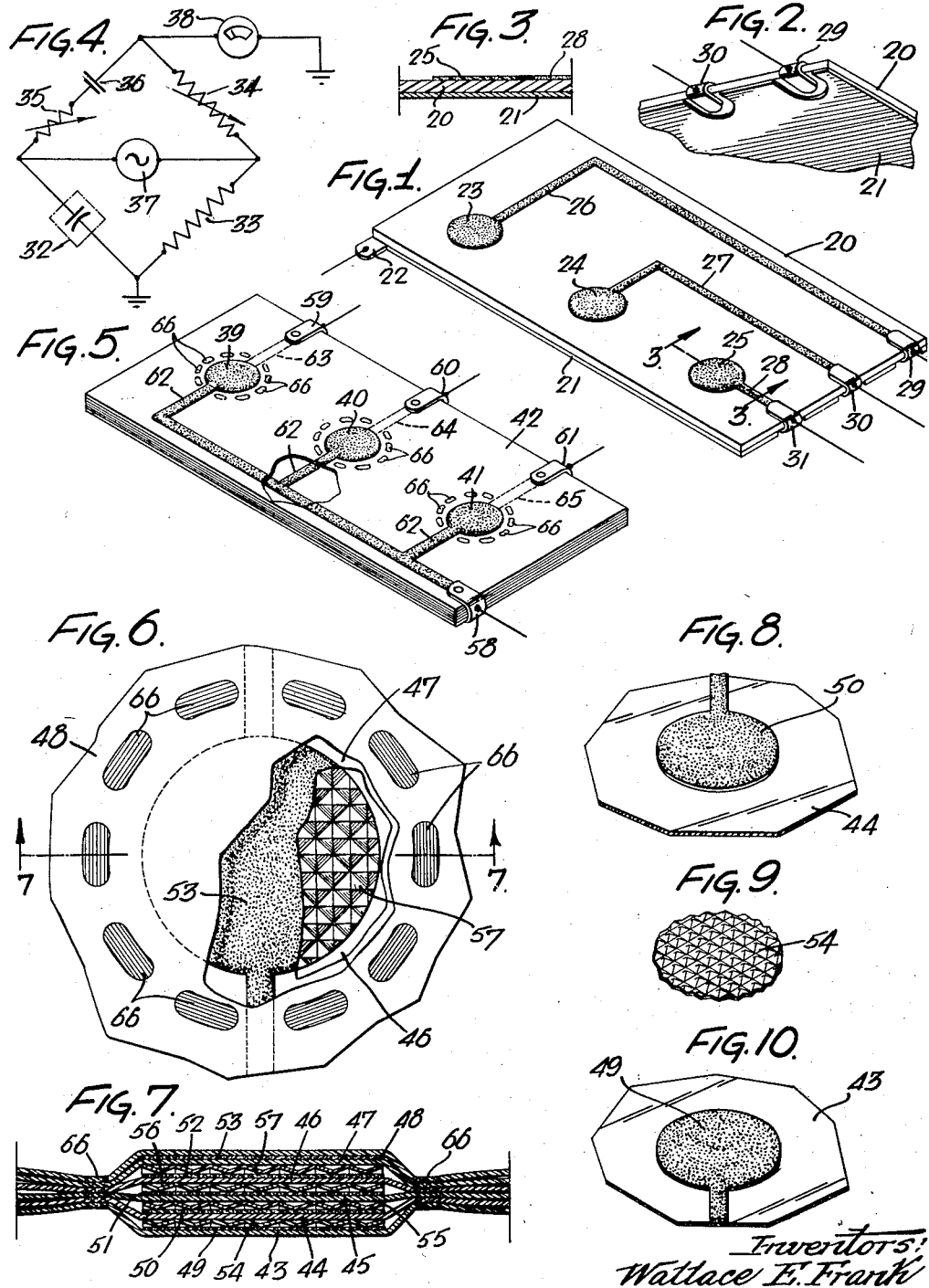
Inventors:
Wallace E. Frank
John J. Boericke, Jr.
By Howson & Howson
Attys.

Dec. 23, 1958
W. E. FRANK ET AL
2,866,141
PRESSURE SENSING DEVICES
Filed June 23, 1954
2 Sheets-Sheet 2
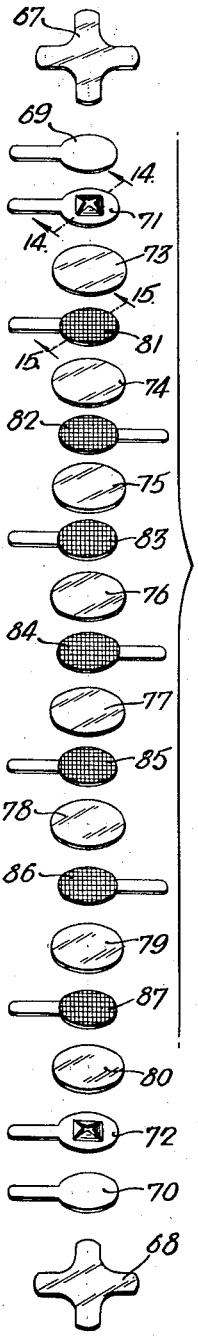
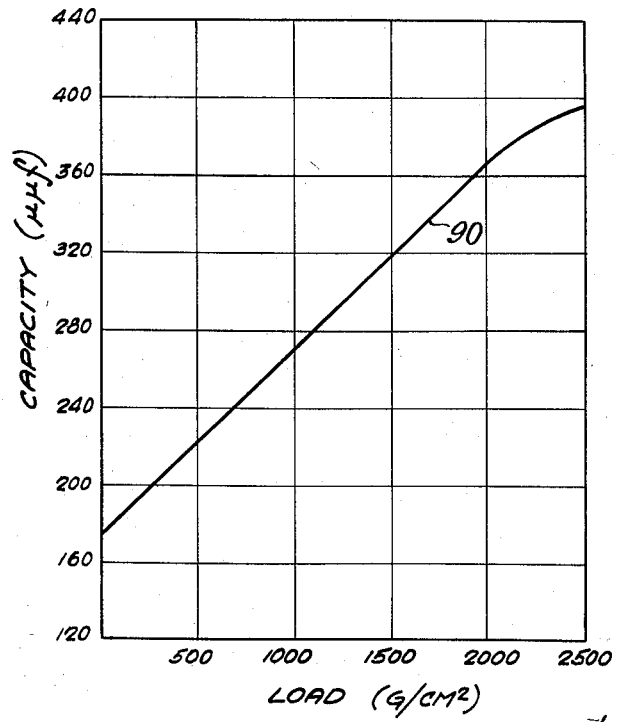

United States Patent Office 2,866,141
Patented Dec. 23, 1958

2,866,141

PRESSURE SENSING DEVICES

Wallace E. Frank, Kintnersville, and John J. Boericke, Jr., Newtown, Pa., assignors to The Franklin Institute, Philadelphia, Pa., a corporation of Pennsylvania Application June 23, 1954, Serial No. 438,846

11 Claims. (Cl. 317—246)

This invention relates to sensing and measurement of localized pressures which may be of small magnitude. The invention is applicable generally to the sensing or detecting of local pressure and also to determination of pressure contours, i. e. determination of pressures existing at various local points or small areas at a plurality of locations of a relatively large total area. For example, the invention is applicable to determination of pressures of various articles of clothing or equipment on a man's body.

One object of the invention is to provide simple and efficient pressure sensing means that will have minimum disturbing effect upon the conditions under which pressure is being measured. Thus the presence of the sensing means between two pressure-exerting surfaces will not appreciably alter or change the pressure pattern.

Another object of the invention is to provide a pressure sensing arrangement for the determination of pressure contours.

The underlying concept of the invention is the provision of one or more miniature capacitor units which are preferably in the general form of buttons to respond to local pressures. Each such unit may be of circular form and may have a diameter of the order of about one-half inch. Where a plurality of units are employed for sensing pressures at a plurality of locations, they are arranged in an array in order that they may respond to local pressures at different points or small areas of a relatively large total area. Each of the button-like capacitor units is in the form of a sandwich including dielectric and conducting elements both of which are preferably of flexible material. The sensing of pressure is accomplished by causing the capacity change of the capacitor unit to be in fixed relation to the exerted pressure. The capacity is a function of the separation of the conducting elements and the dielectric properties of the separating material. The capacitor unit may be constructed so as to use either or both the compression of the dielectric and the deformation of the conductors and/or dielectric to attain a change in capacity as a function of displacement. By using materials which deform elastically, a fixed relationship is obtained between pressure and displacement and hence between pressure and capacity. It should be noted that the displacement is extremely small, being of the order of a few thousandths of an inch.

The invention may be fully understood from the following detailed description with reference to the accompanying drawings illustrating certain exemplary forms.

In the drawings:

Fig. 1 is a perspective view of a simple structural form of the invention;

Fig. 2 is a fragmentary perspective view from the underside;

Fig. 3 is a detail sectional view along line 3—3 of Fig. 1;

Fig. 4 is a diagrammatic illustration of a simple measuring arrangement which may be used;

Fig. 5 is a perspective view of another structural form of the invention;

Fig. 6 is an enlarged face view of one of the capacitor units or buttons of Fig. 5, with portions broken away for purposes of illustration;

Fig. 7 is a sectional view on line 7—7 of Fig. 6;

Figs. 8 to 10 are perspective views of some of the elements of the unit shown in Figs. 6 and 7;

Fig. 11 is a large scale plan view of an individual capacitor unit or button embodying a further construction according to the invention;

Fig. 12 is an edge view or side elevation of the unit shown in Fig. 11;

Fig. 13 is an exploded perspective view showing the parts of the unit shown in Figs. 11 and 12;

Fig. 14 is a sectional view on line 14—14 of Fig. 13 through one of the elements;

Fig. 15 is a sectional view on line 15—15 of Fig. 13 through one of the units; and Fig. 16 is an illustrative graph showing results obtained with a certain form of the invention.

Referring first to Figs. 1 to 3, there is shown a simple form of the invention wherein there is an array of capacitor units or buttons for the sensing of local pressures at different points or small areas, for example, for sensing pressures at a plurality of locations. In the simple illustration, only three capacitor buttons are shown but it will be understood that any desired number may be provided in such a structure. In this structure, there is provided a flexible sheet 20 which serves both as a support and as a flexible and compressible elastic dielectric sheet. This sheet may be composed of any suitable material such as any flexible non-conducting rubber or vinyl plastic. On the lower side of the sheet as illustrated, there is a flexible electrically-conductive layer or coating 21 which may be provided in any suitable manner, for example by applying a conductive silver paint to the one side of the sheet 20 or by cementing metal foil thereto. A connection terminal 22 extends from the conductive layer or coating 21 at any convenient location. On the opposite side of sheet 20 (the upper side in the illustration), there are a plurality of spaced, independent and flexible button-like electrically-conductive elements which are insulated from one another by virtue of their spacing, there being three such elements in the illustration designated by reference numerals 23, 24 and 25. These conductive elements may be provided in any suitable manner, for example by applying conductive silver paint to the side of the sheet 20 or by cementing metal foil thereto. Connectors 26 to 28 extend respectively from the conductive elements 23 to 25 to individual connection terminals 29 to 31. The connectors 26 to 28 may be provided in the same manner as are the conductive elements 23 to 25. The terminals 29 to 31 may be in the form of metal clips embracing the edge of sheet 20, and as may be seen in Fig. 2 the conductive layer or coating 21 is kept clear of the terminals by omitting or removing such conductive layer in the vicinity of the terminals. The purpose of this, of course, is to electrically isolate the conductive layer 21 from the conductive elements 23 to 25.

It will be seen that the structure above described is in the form of a flexible sandwich in which there are a plurality of capacitor units or buttons each of which is in the form of an individual flexible sandwich wherein the dielectric element is elastically compressible and the dielectric and conductive elements are flexible. Each flexible sandwich is relatively thin in the direction of pressure applied thereto. As the conductive layer or coating 21 constitutes a common conductive element for all of the capacitor units or buttons, all of the capacitors have one common electrical level. When compressive force is applied to any one of the areas defined by the conductive elements 23 to 25, the particular capacitor unit or button is elastically compressed and its capacity changes in accordance with the applied pressure due to the elastic compressibility of the unit. Upon removal of the pressure, the capacitor unit restores itself to its original condition. Thus the capacity changes of the individual capacitor units or buttons are representative of pressures applied locally at the pre-established points or small areas at different locations of a larger total area.

Fig. 4 shows a simple arrangement which may be used to measure pressures sensed by the above-described device or those hereinafter described. The arrangement of Fig. 4 comprises a resistor-capacitance bridge wherein the variable capacitor 32 in one arm of the bridge is representative of the capacity sensed by the sensing device. A fixed resistor 33, variable resistors 34 and 35, and a fixed capacitor 36 are provided in the other arms of the bridge shown. An A. C. voltage source 37, which may be an oscillator operating at suitable frequency (e. g. 3000 C. P. S.) and supplying a voltage of suitable magnitude (e. g. 10 volts), is connected across two of the diagonal points of the bridge. A current meter 38 is connected across the other diagonal points of the bridge and is preferably calibrated to indicate pressures directly as represented by changes of the capacitance 32.

Where a single capacitor unit or button is to sense a single particular pressure, such unit may be connected to constitute the variable capacitance arm 32 of the bridge. With the capacitor unit connected and with no pressure applied to it, the bridge may be balanced to give a zero reading of the meter 38. Then when pressure is applied to the capacitor unit, the meter 38 will give an indication of the pressure.

Where pressures at various points are to be determined, as by means of the three capacitor units shown in Fig. 1, the capacitor units may be selectively switched into the capacitive arm 32 of the bridge. The measurement of each pressure may be carried out in the manner above described, the bridge being balanced for each capacitor unit prior to application of the pressure to be determined.

In Figs. 5 to 10, there is shown another structural form according to the invention. Fig. 5 shows a simple arrangement of three capacitor units or buttons, designated generally by reference numerals 39 to 41, on a common supporting structure designated generally by reference numeral 42. In this instance, the common supporting structure 42 is constituted by a plurality of superimposed flexible and compressible elastic sheets preferably composed of flexible plastic material, such as polyethylene, which is of a character to enable heat sealing of the individual capacitor units or buttons as hereinafter described. Each of the capacitor units or buttons 39 to 41 preferably comprises electrically conductive flexible coatings on the plastic sheets and interposed flexible metallic (e. g. aluminum) foil elements which serve as elastic restoring elements.

Fig. 6 and 7 show the structure of each of the capacitor units or buttons of the arrangement of Fig. 5. In the illustrated structure, there are six superposed flexible plastic sheets numbered 43 to 48. As shown in Fig. 7, sheets 43 to 47 have flexible conductive coatings 49 to 53 on their upper surfaces, and interposed between successive pairs of these five sheets are four flexible metallic foil elements 54 to 57 which are of waffle-like form to serve as elastic or spring-like elements. Figs. 8 to 10 show portions of two of the sheets 43 and 44 with the conductive coatings 49 and 50 thereon, and also show the metallic foil element 54 which is interposed between these sheets in alignment with the conductive coatings. The conductive coatings, in the composite capacitor assembly shown in Fig. 7, constitute the conductive elements or plates of the capacitor units. There are five such elements in the illustrated structure, and the two outer ones and also the center element are connected to a common ground terminal 58 (see Fig. 5) while the other two elements are connected to a terminal which is individual to the particular capacitor unit. Fig. 5 shows the terminals 59 to 61 which are individual to the respective capacitor units. Thus, in the array of Fig. 5 the outer conductive elements and the center element of all three capacitor units are connected to the common ground terminal 58, while the intermediate conductive elements of the three capacitor units are connected respectively to the terminals 59 to 61. To this end the plastic sheets are provided with conductive coatings which constitute connectors and which extend from the plate elements of the condenser units to the terminals 59 to 61. In Fig. 5 the connector coatings extending to the common ground terminal 58 are designated generally by reference numeral 62, while the connector coatings extending to the terminals 59 to 61 are designated generally by reference numerals 63 to 65. Portions of the connector coatings may be seen in Figs. 6, 8 and 10.

Each of the condenser units or buttons, as shown in Figs. 6 and 7, is held together as a unitary assembly by heat sealing the plastic sheets at the areas 66 which are circularly arranged about the assembly. While heat sealing is preferred, ordinary stitching could be employed for the same purpose.

It will be seen from the foregoing that a capacitor unit of the character illustrated in Figs. 6 and 7 comprises a series of condensers which are parallel connected electrically and have a common ground. Moreover, in such structure the outer conductive elements are grounded elements and serve to shield the entire capacitor unit against extraneous influence. A multiple condenser unit of this character has the advantage that its total capacity is sufficiently greater than the capacity of the connector elements so as not to be appreciably affected by the latter.

It will also be seen that the structure illustrated in Fig. 5 is in the form of a flexible sandwich in which there are a plurality of capacitor units each of which is a flexible and compressible sandwich structure.

In Figs. 11 to 15 there is shown an individual capacitor unit constructed in accordance with this invention and constituting a further form of the invention. Fig. 13 is an exploded perspective view showing the various flexible elements employed in the unit as illustrated. Thin flexible metal cover elements 67 and 68, preferably of the shape shown, form a cover or casing at least partially enclosing the assembled unit, these cover elements serving as supports for the other elements of the unit and having their extending end portions brought together as shown in Fig. 12 and secured by spot welding. These elements may be formed of steel of .001" thickness. As may be seen in Fig. 13, the assemblage of elements held together in a sandwich by the cover or casing comprises two thin plain surfaced metal elements 69 and 70, two thin spring elements 71 and 72 which are formed from plain surfaced elements and are lanced to provide spring tabs thereon as shown, thin mica elements 73 to 80, and thin metal elements 81 to 87 arranged in alternate relationship with the mica elements. The latter metal elements are preferably waffled to impart elasticity thereto and serve, in conjunction with spring elements 71 and 72, to preload the elements within and supported by the casing, and also serve to frictionally retain said elements against lateral displacement with respect to said casing. Elements 69 to 72 may be formed of spring steel of .001" thickness, while the other metal elements may be formed of low carbon steel of the same thickness. All of the metal elements of the assembly have connector extensions, those of elements 82, 84 and 86 being arranged on one side of the assembly, and the others being arranged on the other side. The connector extensions on each side of the assembled unit are brought together as may be seen in Fig. 12 and may be spot welded. In Fig. 12 the connector extensions on the right side of the unit are designated generally by reference numeral 88, while those on the other side are designated generally by reference numeral 89. It will also be seen that by virtue of the formation of the casing forming elements 67 and 68 the connector extensions are enabled to extend through openings of the casing.

It will be seen that the structure of Figs. 11 to 15 provides a series of flexible component capacitors which are parallel connected electrically. It will be noted also that the outer elements of the assembly are connected together and may be grounded. Thus, this unit has the advantages mentioned above in connection with the structure shown in Figs. 6 and 7.

It should be noted further that in this capacitor unit the elements 71 and 72, in cooperation with the waffled elements 81 to 87, exert force on the thin cover and support elements which are thereby stressed or preloaded in the absence of external loads. This brings the no-load capacity of the unit into a more readily controllable range to provide greater stability and better load-capacity characteristics. It should be noted also that the capacitor unit as a whole is elastic and restores itself to the no-load capacitance upon removal of the external load.

Where it is desired to measure independently a plurality of pressures at a plurality of locations, a plurality of units of the character shown in Figs. 10 to 15 may be arranged in an array. For example, a plurality of these units may be arranged in a blanket employing flexible plastic sheets.

Fig. 16 shows a graph of operation characteristics of a unit of the general character shown in Figs. 11 to 15. The graph shows capacity changes in micro-microfarads for increasing pressures or loads in grams per square centimeter. The curve 90 was derived from operation of a unit employing mild steel conductive elements having a plain thickness of .001 inch and a waffle thickness of .003 inch, and mica elements having a thickness of .0015 inch. It will be seen from the graph that the response of such a unit is substantially linear throughout the operating range, and the unit is highly sensitive to changes of load.

While certain embodiments of the invention have been illustrated and described, the invention is not limited thereto, but contemplates such modifications and other embodiments as may occur to persons skilled in the art.

We claim:

1. Pressure sensing means comprising a flexible sandwich capable of assuming the contour of a non-planar surface to which it may be applied, said sandwich being relatively thin in the direction of pressure applied thereto and including a flexible dielectric and a flexible, elastically compressible conductor structure, which sandwich changes capacity with displacement when pressure is applied thereto as the result of the elastic compressibility of said conductor.

2. Pressure sensing means comprising an array of independent flexible sandwiches on a common flexible supporting structure, each sandwich and the supporting structure being capable of assuming the contour of a non-planar surface to which they may be applied, and each sandwich including a flexible dielectric and a flexible, elastically compressible conductor structure, which sandwich changes capacity with displacement when pressure is applied thereto as the result of the elastic compressibility of said conductor.

3. Means for independently sensing pressures at a plurality of locations comprising an array of independent, flexible sandwiches on a common flexible supporting structure, one of said sandwiches at each of said locations, each sandwich and the supporting structure being capable of assuming the contour of a non-planar surface to which they may be applied, each sandwich including a flexible, elastically compressible dielectric and a flexible conductor structure, which sandwich changes capacity when pressure is applied thereto as the result of the elastic compressibility of said dielectric.

4. Means for independently sensing pressures at a plurality of locations comprising an array of flexible sandwiches on a common flexible supporting structure, one of said sandwiches at each of said locations, each sandwich and the supporting structure being capable of assuming the contour of a non-planar surface to which they may be applied, and each sandwich including flexible conductor elements and flexible and compressible dielectric elements.

5. Means for independently sensing pressures at a plurality of locations as defined in claim 4, in which said flexible conductor elements and said flexible and compressible dielectric elements are bonded to each other.

6. Pressure sensing means comprising a flexible dielectric sheet structure capable of assuming the contour of a non-planar surface to which it may be applied, a flexible conductive coating on said sheet structure, and at least one flexible capacitor unit on said sheet structure and constituted by a portion of said sheet structure and a portion of said conductive coating.

7. Pressure sensing means as defined in claim 6 in which said flexible dielectric sheet structure is composed of a plurality of flexible superposed thin dielectric sheets, and in which the capacitor unit is constituted by aligned portions of said sheets and said conductive coating.

8. Pressure sensing means as defined in claim 7 including flexible, elastically compressible, thin elements interposed between said sheet portions to impart restoring elasticity to said capacitor unit.

9. Means for independently sensing pressures at a plurality of locations comprising a flexible dielectric sheet structure capable of assuming the contour of a non-planar surface to which it may be applied, a flexible conductive coating on said sheet structure, and a plurality of independent, flexible capacitor units one at each location, each of said capacitor units constituted by a portion of said sheet structure and a portion of said conductive coating.

10. A pressure sensing unit, comprising stacked, alternate flexible, thin dielectric elements and elastically compressible flexible thin conductor elements, and a flexible thin casing at least partially enclosing said elements and supporting the same.

11. A pressure sensing unit as defined in claim 10, in which flexible thin spring elements are interposed between said dielectric and conductor elements to preload the said elements and to frictionally retain said elements against lateral movement with respect to said casing.

References Cited in the file of this patent

UNITED STATES PATENTS

| | | |
|---|---|---|
| 1,584,613 | Comstock | May 11, 1926 |
| 1,647,474 | Seymour | Nov. 1, 1927 |
| 1,763,771 | Geloso | June 17, 1930 |
| 2,185,777 | Thomas | Jan. 2, 1940 |
| 2,436,946 | Tatro | Mar. 2, 1948 |
| 2,571,507 | Welch | Oct. 16, 1951 |
| 2,654,060 | Stovall | Sept. 29, 1953 |
| 2,755,796 | Boucke | July 24, 1956 |